US012348296B2

(12) United States Patent
Suh et al.

(10) Patent No.: US 12,348,296 B2
(45) Date of Patent: Jul. 1, 2025

(54) EHT-SIG DETECTION WITH VARIOUS DIVERSITY SCHEMES

(71) Applicant: HUAWEI TECHNOLOGIES CO., LTD., Shenzhen (CN)

(72) Inventors: Jung Hoon Suh, Kanata (CA); Ming Gan, Shenzhen (CN); Jian Yu, Shenzhen (CN); Yan Xin, Kanata (CA); Osama Aboul-Magd, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 17/961,916

(22) Filed: Oct. 7, 2022

(65) Prior Publication Data

US 2023/0036938 A1 Feb. 2, 2023

Related U.S. Application Data

(63) Continuation of application No. PCT/CN2020/106313, filed on Jul. 31, 2020.

(51) Int. Cl.
*H04B 7/06* (2006.01)
*H04L 27/00* (2006.01)
(Continued)

(52) U.S. Cl.
CPC ....... *H04B 7/0689* (2013.01); *H04L 27/0008* (2013.01); *H04L 27/3405* (2013.01); *H04W 84/12* (2013.01)

(58) Field of Classification Search
CPC ..... H04B 7/0689; H04B 7/12; H04L 27/0008; H04L 27/3405; H04L 1/08;
(Continued)

(56) References Cited

U.S. PATENT DOCUMENTS 9,992,000 B2   6/2018  Suh et al.
11,831,448 B2 * 11/2023 Xu ........................ H04W 76/15
(Continued)

FOREIGN PATENT DOCUMENTS

CN    110708148 A    1/2020
CN    111096044 A    5/2020
(Continued)

OTHER PUBLICATIONS

IEEE P802.11ax_D6.0, Draft Standard for information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Nov. 2019, 780 pages.
(Continued)

*Primary Examiner* — Dominic E Rego

(57) ABSTRACT

A method of communication includes duplication of a first field of a first content channel into a third field in a third content channel and applying a modulation and coding scheme (MCS) to only one of the first field and the third field. The first content channel is a first portion of a frame and the third content channel is a third portion of the frame. Duplication of a second field of a second content channel into a fourth field in a fourth content channel and applying a modulation and coding scheme (MCS) to only one of the second field and the fourth field. The second content channel is a second portion of a frame and the fourth content channel is a fourth portion of the frame. The first content channel and the second content channel form a first group of content channels and the third content channel and the fourth content channel form a second group of content channels. The method then transmits the frame.

19 Claims, 12 Drawing Sheets

(51) Int. Cl.
*H04L 27/34* (2006.01)
*H04W 84/12* (2009.01)

(58) Field of Classification Search
CPC . H04L 27/2602; H04L 27/362; H04L 5/0023; H04L 5/0048; H04W 84/12
See application file for complete search history.

(56) References Cited

U.S. PATENT DOCUMENTS

| | | | | |
|---|---|---|---|---|
| 2004/0077378 | A1* | 4/2004 | Kim | H04B 7/0634 455/562.1 |
| 2011/0261774 | A1* | 10/2011 | Lunttila | H04L 1/1858 375/267 |
| 2015/0237626 | A1* | 8/2015 | Li | H04W 72/21 370/336 |
| 2016/0112851 | A1* | 4/2016 | Li | H04L 69/22 370/338 |
| 2016/0301500 | A1 | 10/2016 | Suh et al. | |
| 2017/0181136 | A1* | 6/2017 | Bharadwaj | H04W 72/12 |
| 2018/0013527 | A1 | 1/2018 | Sun et al. | |
| 2018/0254871 | A1* | 9/2018 | Choi | H04W 72/0453 |
| 2018/0288754 | A1* | 10/2018 | Choi | H04L 5/0064 |
| 2018/0323921 | A1* | 11/2018 | Choi | H04B 7/0452 |
| 2019/0036642 | A1* | 1/2019 | Huang | H04L 1/00 |
| 2019/0296884 | A1 | 9/2019 | Cao et al. | |
| 2020/0120668 | A1* | 4/2020 | Lee | H04L 5/0055 |
| 2021/0127333 | A1* | 4/2021 | Park | H04L 27/02 |

FOREIGN PATENT DOCUMENTS

| | | |
|---|---|---|
| CN | 111213428 A | 5/2020 |
| WO | 2020145890 A1 | 7/2020 |

OTHER PUBLICATIONS

IEEE P802.11ba , Draft Standard for Information technology Telecommunications and information exchange between systems Local and metropolitan area networks Specific requirements,; Part 11: Wireless LAN Medium Access Control (MAC) and Physical Layer (PHY) Specifications; Amendment 3: Wake-Up Radio Operation, Jan. 2020, 187 pages.

* cited by examiner

EHT-SIG DETECTION WITH VARIOUS DIVERSITY SCHEMES

CROSS-REFERENCE TO RELATED APPLICATIONS

The present application is a continuation of International Application No. PCT/CN2020/106313 filed Jul. 31, 2020 and entitled "EHT-SIG DETECTION WITH VARIOUS DIVERSITY SCHEMES", the contents of which are incorporated herein in their entirety.

FIELD OF THE INVENTION

This invention relates to wireless communications systems and methods, and more particularly to systems and methods for the use of diversity schemes to encode information in wireless data frames.

BACKGROUND

Institute of Electrical and Electronics Engineers (IEEE) standards publications 802.11 outline protocols for implementing wireless local area networks (WLAN) and sets forth a physical (PHY) layer frame format that includes a preamble portion carrying control data and a payload portion carrying data. There have been various extensions to the 802.11 standards, for example 802.11ax, for providing a High Efficiency (HE) WLAN. The 802.11ax standard is designed to operate in licensed exempt bands between 1 and 6 GHz as well as work over legacy 2.4 and 5 GHz bands.

In order to implement systems with more advanced features to achieve performance improvement such as higher speed, longer range, less power, more reliable communications, improved spectrum efficient utilization, etc. Wireless data is modulated and encoded using modulation and coding schemes (MCS) in order to help achieve these goals. The 802.11 standards specify a number MCS which are referred to by index numbers such as MCS 0, MCS 1, MCS 2, etc. Each MCS option specifies modulation type and coding rate for 20 MHz and 40 MHz channels.

Examples of improvements included in newer versions of the 802.11 standard are better power-control methods to avoid interference with neighboring networks, orthogonal frequency-division multiple access (OFDMA), higher order 1024-QAM, and up-link direction added with the down-link of MIMO and MU-MIMO to further increase throughput.

As the standard evolves it is desirable that newer versions of the standard are backwards compatible with previous versions while supporting future expansions. Specific fields in the 802.11 frame, such as the U-SIG and EHT-SIG frame are used to communicate frame format information for present and future versions. There is a need for a method and apparatus for applying various diversity schemes to the EHT-SIG field information in ways that improve the performance of the wireless system.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for potentially improving the effective gain in the detection of EHT-SIG fields in transmitted 802.11 frames. In some embodiments, EHT-SIG fields in a 20 MHz channel are duplicated in another 20 MHz channel of the 80 MHz frame. Various diversity schemes may be applied to the duplicate EHT-SIG fields in to realize a detection gain at a receiver when the EHT-SIG field and the duplicate EHT-SIG field are used together.

Various embodiments of the present invention apply a DCM scheme to an EHT-SIG field of a secondary 40 MHz channel forming part of an overall 80 MHz channel. Various embodiments of the present invention provide for a DCM scheme for MCS 5. Various embodiments of the present invention provide a bit-wise interleaver for the EHT-SIG field of the secondary 40 MHz channel of the overall 80 MHz channel. Various embodiments of the present invention provide a QAM symbol based tone mapper for the EHT-SIG field of the secondary 40 MHz channel of the overall 80 MHz channel. Various embodiments of the present invention provide for puncturing applied to MCS 4 in combination with DCM.

An embodiment of the disclosure includes a method of communication including duplicating a first field of a first channel into a third field in a second channel where the first channel is a first portion of the frame and the third channel is a third portion of the frame. The method includes applying a first diversity scheme to only one of the first field or the third field. The method includes duplicating a second field of a second channel into a fourth field in a fourth channel where the second channel is a second portion of the frame and the fourth channel is a fourth portion of the frame. The first channel and the second channel form a first group of channels. The third channel and the fourth channel form a second group of channels. The method includes applying a second diversity scheme to only one of the second field or the fourth field. The method includes transmitting the frame.

In further embodiments, the first diversity scheme is applied to the first field and the second diversity scheme is applied to the second field, and the first diversity scheme and the second diversity scheme are the same.

In further embodiments, the first diversity scheme is applied to the third field and the second diversity scheme is applied to the fourth field, and the first diversity scheme and the second diversity scheme are the same.

Further embodiments include applying a third diversity scheme, different from the first diversity scheme, to the one of the first field or the third field to which the first diversity scheme is not applied. Further embodiments may also include applying a fourth diversity scheme, different from the second diversity scheme, to the one of the second field or the fourth field to which the second diversity scheme is not applied.

In any of the aforementioned embodiments, the first channel, the second channel, the third channel, and the fourth channel are 20 MHz channels compatible with an 802.11 wireless standard, and the frame is an 80 MHz channel compatible with the 802.11 wireless standard.

In any of the aforementioned embodiments, the first field and the third field are extremely high throughput signal (EHT-SIG) fields.

In any of the aforementioned embodiments, the second field and the fourth field are extremely high throughput signal (EHT-SIG) fields.

In any of the aforementioned embodiments, the first diversity scheme or the second diversity scheme is a dual sub carrier modulation (DCM) applied to the third channel and the fourth channel. In any of the aforementioned embodiments, an MCS 5 option has been selected.

In any of the aforementioned embodiments, the first diversity scheme or the second diversity scheme is a tone mapper applied to the QAM symbols of the third channel and the fourth channel.

In any of the aforementioned embodiments, the first diversity scheme or the second diversity scheme is a different binary convolutional coding (BCC) puncturing pattern applied to the third channel and the fourth channel while an MCS 4 option has been selected.

An embodiment of the disclosure includes a communications device for transmitting a wireless frame. The communications device includes a framer for producing a frame, a radio unit for transmitting the frame, and processing electronics, such as digital electronic components, analog electronic components, a processor (e.g. CPU) and a non-transitory computer readable medium storing instructions executable by the processor, or a combination thereof. The processing electronics cause the communications device to duplicate a first field of a first channel into a third field in a third channel where the first channel is a first portion of the frame and the third channel is a third portion of the frame. The processing electronics further cause the communications device to apply a first diversity scheme to only one of the first field or the third field. The processing electronics further cause the communications device to duplicate a second field of a second channel into a fourth field in a fourth channel where the second channel is a second portion of the frame and the fourth channel is a fourth portion of the frame. The first channel and the second channel form a first group of channels. The third channel and the fourth channel form a second group of channels. The processing electronics further cause the communications device to apply a second diversity scheme to only one of the second field or the fourth field. The processing electronics further cause the communications device to transmit the frame.

In any of the aforementioned embodiments, the first channel, the second channel, the third channel, and the fourth channel are 20 MHz channels compatible with an 802.11 wireless standard, and the frame is an 80 MHz channel compatible with the 802.11 wireless standard.

In any of the aforementioned embodiments, the first field and the third field are extremely high throughput signal (EHT-SIG) fields.

In any of the aforementioned embodiments, the second field and the fourth field are extremely high throughput signal (EHT-SIG) fields.

In any of the aforementioned embodiments, the first diversity scheme or the second diversity scheme is a dual sub carrier modulation (DCM) is applied to the third channel and the fourth channel. In any of the aforementioned embodiments, an MCS 5 option has been selected.

In any of the aforementioned embodiments, the first diversity scheme or the second diversity scheme is a tone mapper applied to the QAM symbols of the third channel and the fourth channel.

In any of the aforementioned embodiments, the first diversity scheme or the second diversity scheme is a different binary convolutional coding (BCC) puncturing pattern applied to the third channel and the fourth channel while an MCS 4 option has been selected.

Embodiments of the present invention may be used to achieve a result of increased detection gain on the wireless channel. This can be achieved through application of one or more encoding schemes, diversity or redundancy schemes, or the like. The particular coding, diversity and signal redundancy schemes as described herein can advantageously be applied in compliance with IEEE 802.11 scenarios to potentially achieve improved performance.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

The IEEE 802.11 family of wireless communication protocols, commonly known as WiFi® and also referred to herein simply as 802.11, includes a wide variety of hardware and software components that allow for the wireless networking of electronic computing devices such as computers, tablets, cell phones, terminals, Internet of Things (IoT), and other mobile and fixed devices. 802.11 is commonly used as a wireless replacement or alternative to wired Ethernet networking to access local area networks or the Internet.

Members of the 802.11 family are differentiated from each other by suffixes such as "802.11a", "802.11n", etc. and continue to improve over time. 802.11 implementations take advantage of quadrature amplitude modulation (QAM), multiple input multiple output (MIMO) antennas, communicate on multiple frequencies such as 2.4 GHz and 5 GHz, and other technologies. Recent advances support higher nominal data rates, higher spectrum efficiency, are more resistant to interference, and include what is known as Extremely High-Throughput (EHT) PHY (physical layer) technology to improve the performance of existing applications and to enable future applications such as streaming high definition video.

Figure 1:
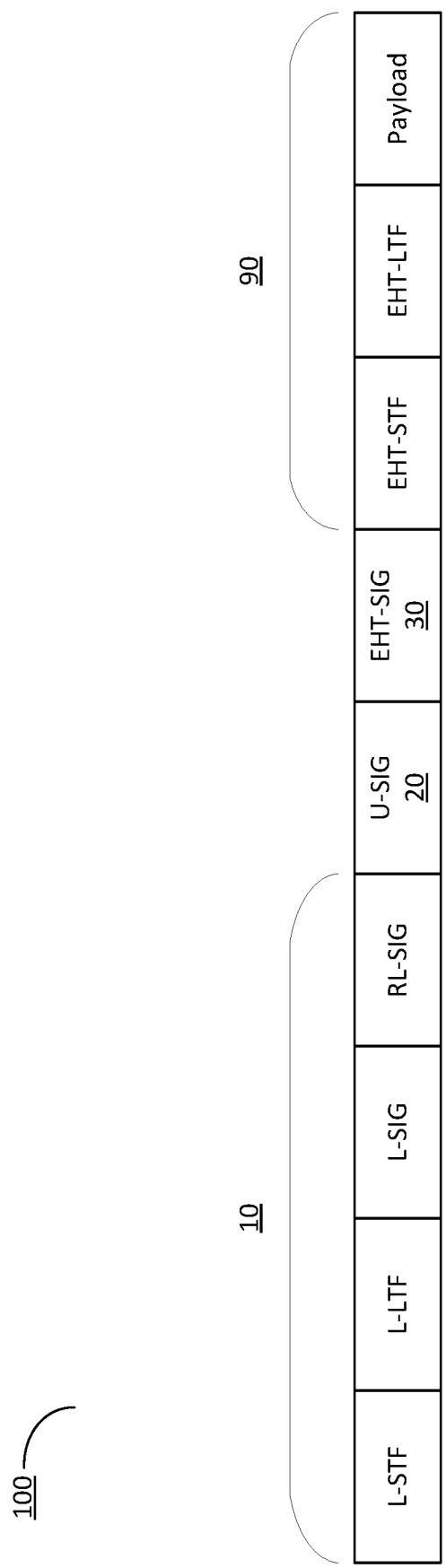
FIG. 1 illustrates an 802.11 frame, according to an embodiment of the present disclosure.

802.11 is a frame-based protocol as shown in the EHT frame 100 illustrated in FIG. 1. The frame starts with the fields of the legacy preamble 10: legacy short training field (L-STF), legacy long training field (L-LTF), legacy signal field (L-SIG), and RL-SIG. Next comes a universal signal field (U-SIG) 20 and then the EHT signal field (EHT-SIG) 30. Following the EHT-SIG 30 field are the EHT-STF, EHT long training field, and data payload referred to as a group 90. RL-SIG and U-SIG may use MCS 0, which is generally a BPSK scheme with code rate ½. U-SIG can indicate which MCS scheme (e.g. MCS 0, 1, 2, 3, 4 or 5) is being used for at least EHT-SIG.

Different fields of EHT frame 100 may use different modulation and coding schemes (MCS) that define the modulation, coding and other signal and protocol parameters used on for information transmitted and received over the wireless link.

The U-SIG field 20 provides an explicit indication of frame formats to aid in future enhancements to the 802.11 standard. U-SIG 20 contains both version-independent information and version dependent information such as a PHY identifier, upload/download flag, and transmission parameters. U-SIG also includes a bandwidth indication. Accordingly, if four 20 MHz channels are being used to transmit a packet as in FIG. 2, the receiver can obtain this information by decoding U-SIG.

EHT-SIG field 30 includes additional information not included in U-SIG 20 but that is used to support EHT features. The EHT-SIG 30 field may use a different MCS than U-SIG 20 or payload 90 and contain common and user specific information. The common fields may include information about the Resource Unit Allocation for users. User-specific fields may include information for multi-user (MU) frames and carry dedicated information for individual stations such as MCS, the number of streams, coding, etc.

Figure 2:
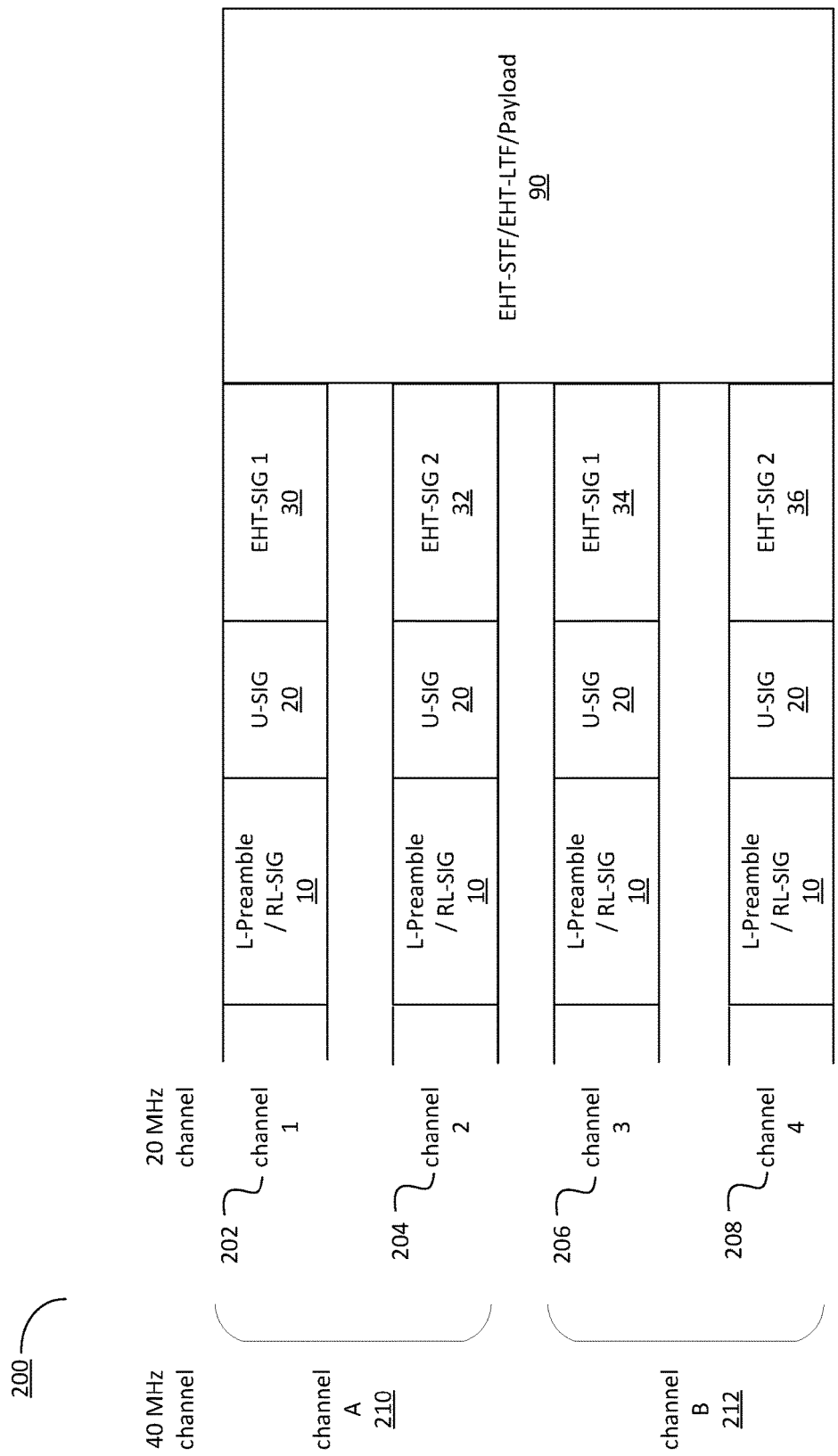
FIG. 2 illustrates four 802.11 20 MHz channels organized into two 40 MHz channels in a frame, according to an embodiment of the present disclosure.

802.11 uses a plurality of 20 MHz channels (frequency bands), that may be transmitted simultaneously in groups to implement large band transmissions. For example, two 20 MHz channels may form a 40 MHz channel and four 20 MHz channels may form an 80 MHz channel. In the case of a transmitter using an 80 MHz channel, four EHT-SIG fields will be transmitted as shown in FIG. 2 where the four EHT-SIG fields are labelled 30, 32, 34, and 36. In some embodiments, the content of EHT-SIG 1 field 30 of channel 1 is duplicated in the EHT-SIG 1 field 34 of channel 3. The content of EHT-SIG 2 field 32 of channel 2 is duplicated in the EHT-SIG 2 field 36 of channel 4. The duplication of the EHT-SIG field content adds additional redundancy to transmissions and has the effect of increasing the overall signal to noise ratio (SNR) of the system. Other fields with legacy information may be duplicated in multiple 20 MHz channels.

A key design consideration of a communications channel is the SNR that is required to correctly receive a transmitted signal. After a signal is transmitted, it will be distorted, attenuated, and be corrupted by noise generated within the channel and from interfering signals on the same or adjacent frequencies. At the receiver, the ratio of the received signal level to the noise level in the channel must be sufficient to correctly receive the transmitted signal. In general, the SNR decreases with longer transmissions, faster transmissions, and when using more complex MCS. MCS are chosen to increase the SNR which lowers the error rate on a wireless channel and allows for increased throughput.

One aspect of MCS that is available for use in 802.11 systems is binary convolutional coding (BCC), which is a type of error correcting encoding. BCC encoding generates parity symbols via a sliding application of a Boolean polynomial function to an input data stream. The sliding application represents the "convolution" of the encoder over the input data. Using BCC encoding the encoded word is dependent on the current state of the encoder and the input. BCC and many other encoding schemes add additional bits to be transmitted, thereby decreasing the data transmission rate. As BCC is an error correcting code, a number of bit errors that occur during communication may be corrected, thereby improving the throughput of the system.

Figure 3:
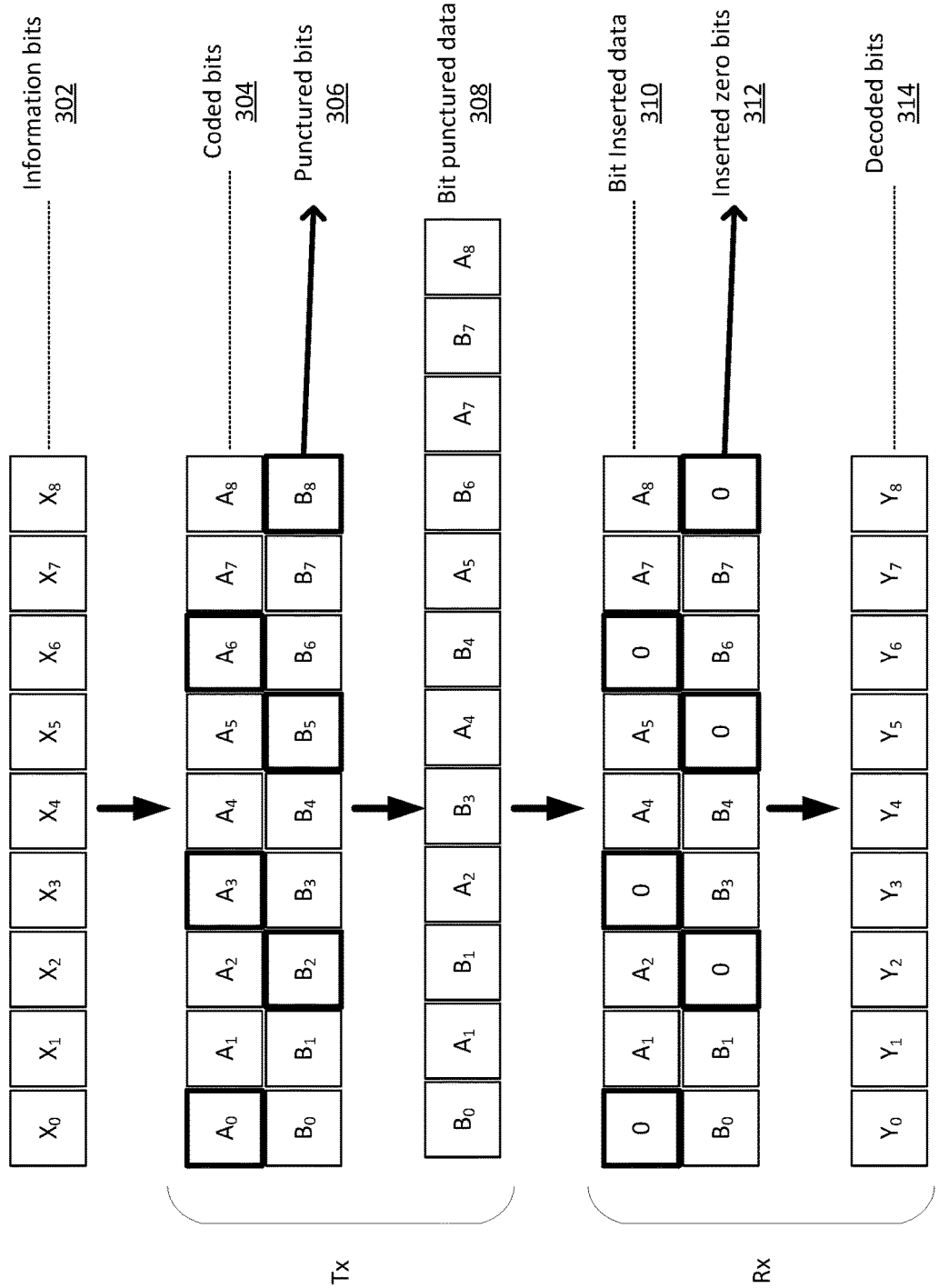
FIG. 3 illustrates modulation and coding schemes (MCS) data encoding, according to an embodiment of the present disclosure.

As illustrated in FIG. 3, some MCS data encoding involves the addition of information to the original data. Starting with information bits 302 $X_0, X_1, \ldots, X_8$, encoding produces coded bits 304 $A_0, A_1 \ldots A_8$ and $B_0, B_1, \ldots, B_8$. Puncturing is the process of removing some of the redundant information introduced by the encoding process. In FIG. 3 punctured bits 306 are outlined in a heavy box. Puncturing may be viewed as increasing the effective data transmission rate or as having less redundancy in the transmitted bit stream. Puncturing potentially increases the spectral efficiency of the communications channel while transmitting more data within a given bandwidth. Bit punctured data 308 are then transmitted. At the receiver, bit inserted data 310 is received with the punctured bits replaced with inserted zero bits 312. The receiver is then able to recover the decoded bits 314 $Y_0, Y_1, \ldots, Y_8$, which are ideally the same as the original information bits 302.

Puncturing in conjunction with BCC encoding can potentially provide redundancy and an acceptable bit error rate (BER) for high code rates (greater than ½). The 802.11 specification specifies puncturing (and a specific puncturing pattern) for some MCS encodings. The 802.11 standard specifies that the MCS2 encoding utilizes a ¾ code rate BCC however other MCS encoding schemes with a code rate greater than ½ may also be used, for example a ⅔ code rate.

The use of multiple, duplicate transmissions, error-correcting codes such as BCC, and puncturing are examples of what may be referred to as diversity schemes to improve the effective SNR of a communications channel without increasing the transmitting power of a transceiver.

In accordance with various embodiments of the present invention, there is provided a system, apparatus, and method of using MCS to increase the SNR of the EHT-SIG fields in 802.11 communications systems. Other embodiments use the teachings herein to apply the same diversity scheme to provide similar benefits to other communications systems in which these diversity schemes may be used.

In order to facilitate EHT-SIG field detection, some embodiments of the present invention include applying a puncturing pattern for a BCC code rate to duplicate EHT-SIG fields 34 and 36 (see FIG. 2) in the frequency domain. At a receiver, the information from EHT-SIG fields 30 and 32 (see FIG. 2) is combined with information from duplicate EHT-SIG fields 34 and 36 to achieve a combining gain of about 3 dB. An additional gain of about 1-2 dB may also be achieved through the use of the puncturing pattern applied to the duplicate EHT-SIG field information in the frequency domain.

The EHT-SIG 30 can be lengthy and thus cause overhead issue when processing the EHT frame 100. However, a high MCS (MCS 3 or higher) may be selected for the EHT-SIG which may reduce the overhead of EHT-SIG significantly. By duplicating the contents of EHT-SIG fields (EHT-SIG 1 30 and EHT-SIG 2 32) on 40 MHz channels (two 20 MHz channels) so that the field contents are transmitted twice, a gain in the detection performance is potentially achieved. Embodiments may also apply various diversity schemes to the duplicated 40 MHz portion (EHT-SIG 1 34 and EHT-SIG 2 36) to potentially achieve further performance gains. This may allow the use of a higher MCS applicable, especially for situations that are at the boundary of an acceptable SNR performance without lowering the MCS. As used herein, references to the duplication of EHT-SIG fields refers to the duplication of the contents of the EHT-SIG fields. As used herein, "higher" MCS refers to MCS 3 and above.

FIG. 1 illustrated the format of an EHT frame 100. FIG. 2 illustrates four 20 MHz channels (also referred to as content channels) which form a combined 80 MHz channel 200. The EHT-SIG 1 represents the EHT-SIG content of channel 1 202, and the EHT-SIG 2 represents the EHT-SIG content of channel 2 204. Channel 1 202 and channel 2 204 may be viewed as a first 40 MHz channel A 210. Similarly, channel 3 206 and channel 4 208 may be viewed as a second 40 MHz channel B 212. These two content channels of the first 40 MHz channel A 210 may be repeated and duplicated in the second 40 MHz channel B 212. At the receiver side, this duplication may result in about a 3 dB detection gain being achieved. In further embodiments, various diversity schemes may be applied to the secondary 40 MHz channel B 212 to achieve additional combining gains at a receiver.

In some embodiments, a dual subcarrier modulation (DCM) diversity scheme may be applied to EHT-SIG 1 34 of channel 3 206 and EHT-SIG 2 36 of channel 4 208 in the second 40 MHz channel B 212. DCM is used with an MCS that may be applied to modulation schemes such as binary phase shift keying (BPSK), quadrature phase shift keying (QPSK) and quadrature amplitude modulation (QAM). With DCM, the same information is modulated on a pair of subcarriers. Alternatively, DCM may be applied to EHT-SIG 1 30 and EHT-SIG 2 32 of 40 MHz channel A 210 rather than to the EHT-SIG fields of 40 MHz channel B 212.

In some embodiments, a DCM diversity scheme is applied to EHT-SIG 1 34 of channel 3 206 and EHT-SIG 2 36 of channel 4 208 in the second 40 MHz channel B 212, while concurrently an MCS without a DCM is applied to EHT-SIG 1 30 of channel 1 202 and EHT-SIG 2 32 of channel 2 204 in the first 40 MHz channel A 210, and an MCS without a DCM is applied to EHT-SIG 1 34 of channel 3 206 and EHT-SIG 2 36 of channel 4 208 in the second 40 MHz channel B 212

In some embodiments, a DCM is applied to EHT-SIG 1 34 of channel 3 206 and EHT-SIG 2 36 of channel 4 208 in the second 40 MHz channel B 212, while concurrently an MCS with a DCM is applied to EHT-SIG 1 30 of channel 1 202 and EHT-SIG 2 32 of channel 2 204 in the first 40 MHz channel A 210, and an MCS with a DCM is applied to EHT-SIG 1 34 of channel 3 206 and EHT-SIG 2 36 of channel 4 208 in the second 40 MHz channel B 212

In embodiments, the U-SIG field 20 may be used to indicate which MCS has been applied to the EHT-SIG fields. Using some 802.11 standards and options DCM MCS is available as an option. For example, in the 802.11ax standard DCM is available to be applied in the case that MCS 0/1/3/4 is selected. In embodiments, such as the case when MCS 4 is selected, a different BCC puncturing pattern may be applied to channel 3 206 and EHT-SIG 2 36 of channel 4 208 in the second 40 MHz channel B 212. EHT-SIG 1 30 and duplicate EHT-SIG 1 34 are at different frequencies and are encoded using different puncturing patterns. Similarly, EHT-SIG 2 32 and duplicate EHT-SIG 2 36 are at different frequencies and are encoded using different puncturing patterns. 802.11 standards, such as the 802.11n, 802.11ac, and 802.11ax standards, define a number of puncturing patterns that may be used for code rates higher than ½. As used herein, "different" puncturing patterns refer to puncturing patterns different from the incumbent patterns of existing 802.11 standards.

In embodiments, if the MCS applied to an EHT-SIG field is a regular MCS without DCM, the DCM diversity scheme may be applied to the EHT-SIG fields 34 and 36 of the second 40 MHz channel B 212. The content of the EHT-SIG fields of each 20 MHz channel may be encoded individually, but two content channels in the primary 40 MHz channel A 210 are duplicated in the secondary 40 MHz channel B 212. When the DCM is applied to the duplicated second 40 MHz channel B 212, the same DCM scheme as the DCM applied to the MCS 0/1/3/4 in the 802.11ax standard may be utilized.

When the MCS for the EHT-SIG field is MCS 0 or 1, the EHT-SIG field 34 and EHT-SIG 2 field 36 of secondary 40 MHz channel B 212 may be modified. The 802.11 standards may utilize 20 MHz channels that are divided up into 64 subcarriers spaced 312.5 KHz apart. The majority of subcarriers are used for data while a few are specified at pilot or null sub carriers. Pilot subcarriers are dedicated to pilot signals that aid in signal detection at a receiver. Null subcarriers have substantially no energy dedicated to modulation. For every non-null and non-pilot subcarriers of the secondary 40 MHz EHT-SIG fields, in the case of MCS 0, $d_k \times e^{i(k+N_{SD})\pi}$ may be added to the EHT-SIG fields 34 and 36. In the case of MCS 1 being used, $\text{conj}(d_k)$ may be added to the EHT-SIG fields 34 and 36. In this example, $d_k$ represents the data corresponding to the k-th subcarrier of each EHT-SIG field content channel in the primary 40 MHz channel A 210, and $N_{SD}$ represents 48 data tones. $N_{SD}$ may represent the number of tones excluding nulls and pilots in a symbol. The operation conj(x) represents a complex conjugate operation, which corresponds to the practical signal processing implementation corresponding to changing sign of an imaginary portion of a value.

When the MCS for the E-SIG is MCS 2, a similar DCM scheme to that used for MCS 1 may be used. For every non-null and non-pilot subcarrier of the secondary 40 MHz EHT-SIG fields, conj($d_k$) may be applied, where $d_k$ represents the data corresponding to the k-th subcarrier of each EHT-SIG content channel in the primary 40 MHz channel A 210.

When the MCS for the EHT-SIG field is MCS 3 or 4, the orientation of the 4 bits modulated to a 16 QAM symbol is re-oriented as is used in the 802.11ax standard. The 4 bits, referred to as $B_{4k}$, $B_{4k+1}$, $B_{4k+2}$, and $B_{4k+3}$ are re-oriented as $B_{4k+1}$, $B_{4k}$, $B_{4k+3}$, and $B_{4k+2}$, where Bk represents one of the bits composing a QAM symbol. Re-orientation may also be referred to as re-ordering.

When the MCS for the EHT-SIG field is MCS 5, the bits may be re-oriented. Because MCS 5 is 64-QAM based (with code rate 2/3), there are six bits mapped to a subcarrier. Those 6 bits are $B_{4k}$, $B_{4k+1}$, $B_{4k+2}$, $B_{4k+3}$, $B_{4k+4}$, and $B_{4k+5}$, where the subscript represents the serial ordering of the bits. Embodiments of the present invention re-orient (re-order) these 6 bits as $B_{4k+1}$, $B_{4k}$, $B_{4k+3}$, $B_{4k+2}$, $B_{4k+5}$, and $B_{4k+4}$, where B represents the coded bits corresponding to each k-th subcarrier. This DCM scheme for MCS 5 is provided as an embodiment of the present invention.

In embodiments, the BCC encoded data bits may be (bit-wise) interleaved additionally for the EHT-SIG fields of the secondary channel B 212. The interleaver scheme of the 802.11 standard may be used which includes parameters $N_{col}$, $N_{row}$, and $N_{rot}$ based on 802.11 $N_{SD}$ 48. Other interleaver schemes may also be utilized. In this manner, and according to various embodiments, bit-wise interleaving is applied to the EHT-SIG field of the secondary channel B, while no additional interleaving is applied to the EHT-SIG filed of the primary channel A. Accordingly, interleaving is applied once to the primary channel A 210 and twice to the secondary channel B 212.

QAM takes a number of data bits and maps them to QAM constellation points. The higher the density of the modulation, such as 256-QAM or 1024-QAM, the more bits may be mapped at a time. Tone mapping may be used to cause the constellation points to be mapped to orthogonal frequency division multiplexing (OFDM) subcarriers that are sufficiently separated from each other. In embodiments a QAM symbol based tone-mapper may be applied (on the EHT-SIG field) to only one of channel A 210 or channel B 212, while not being applied to the EHT-SIG filed of the other one of channel A and channel B. The IEEE 802.11 20 MHz based tone mapper with a tone mapping distance (DTM) of 4 may be used. Alternatively, a different tone mapper may be used. Tone mapping is applied separately per 20 MHz channel. As will be readily understood, tone mapping is applied on symbols, such as QAM symbols.

In some embodiments, the tone mapping is applied on the secondary channel B 212, while not being applied to the primary channel A 210. In some embodiments, tone mapping according to one rule is applied on the primary channel A 210 and tone mapping according to another, different rule is applied on the secondary channel B 212. A tone mapping rule is a reversible mapping between constellation points and OFDM subcarriers. Tone mapping applied on a channel may comprise tone mapping applied to the EHT-SIG field communicated on that channel.

In embodiments a puncturing pattern scheme may be applied on top of the DCM MCS for the EHT-SIG fields. Puncturing is the process of removing some of the extra bits after encoding with an error-correction code. This has the same effect as encoding with an error-correction code with a higher rate, or less redundancy.

In various embodiments, a different puncturing pattern is applied to the secondary 40 MHz channel B 212 than is applied to the primary 40 MHz channel A 210. DCM can be applied along with MCS, where appropriate. For example, DCM can be applied with MCS 4. Accordingly, in various embodiments of the present invention, up to 10 different levels of MCS are available for EHT-SIG field. These are MCS 0, MCS 1, MCS 2, MCS 3, MCS 4, MCS 5, MCS 0 with DCM, MCS 1 with DCM, MCS 3 with DCM and MCS 4 with DCM.

DCM can be applied to the EHT-SIG fields as is done for some preamble fields in the 802.11ax standard for MCS 0/1/3/4. The MCS applied to the EHT-SIG may be indicated in the U-SIG field 20. In embodiments, for the MCS 4 case with DCM, a BCC puncturing pattern may be applied to the EHT-SIG field 34 and EHT-SIG 2 field 36 of secondary 40 MHz channel B 212. The gain achieved through the use of DCM is combined with the gain achieved from applying the different BCC puncturing patterns to the secondary 40 MHz channel B 212.

Figure 4:
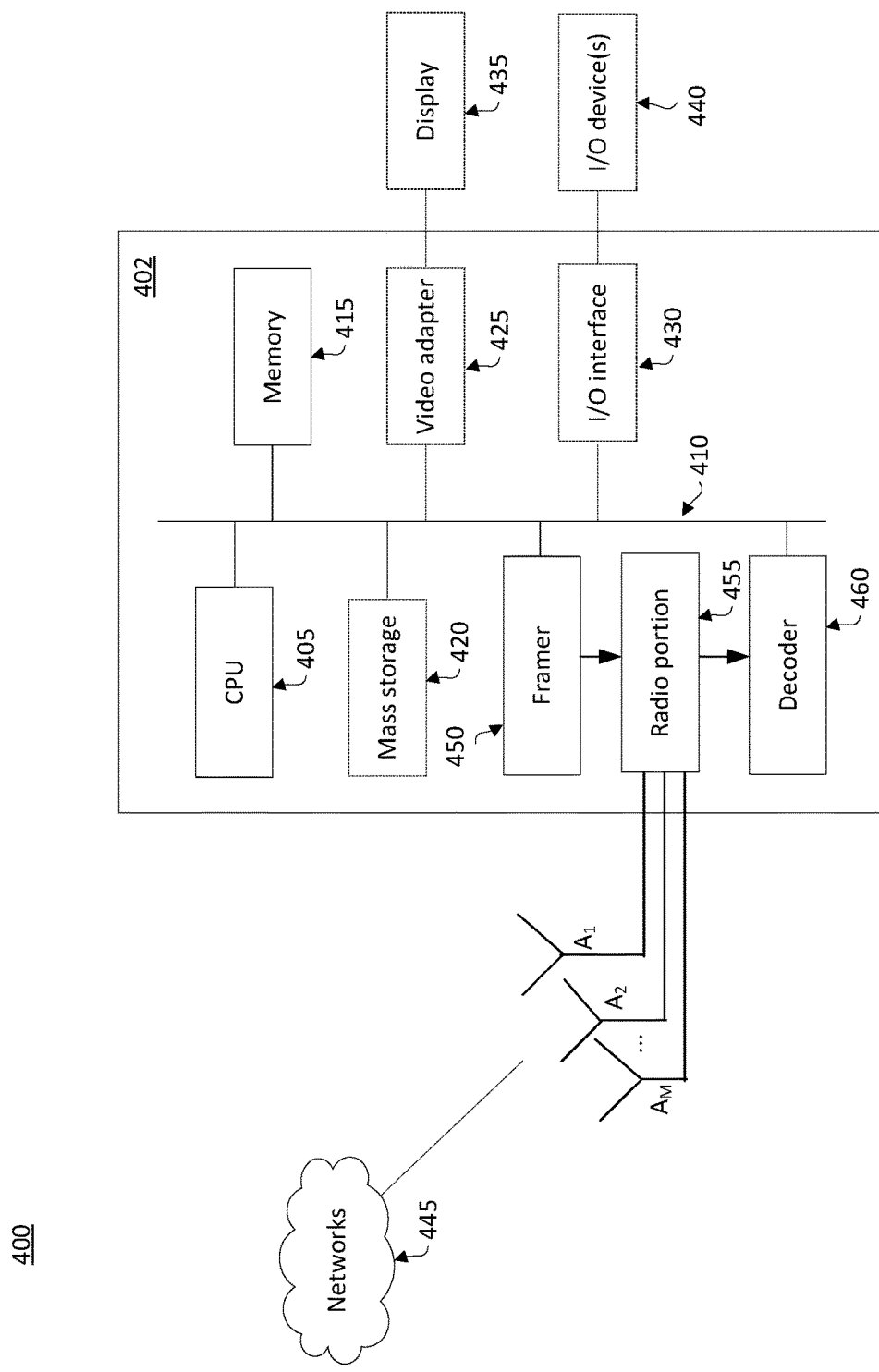
FIG. 4 illustrates a communications device that may perform any or all of operations of the methods and features described herein, according to an embodiment of the present disclosure.

FIG. 4 is a schematic diagram of a communications device 400 that may perform any or all of operations of the above methods and features explicitly or implicitly described herein, according to different embodiments of the present invention. For example, an access point (AP) or another wireless device may be configured as communications device 400. It is noted that various illustrated components of the device 400 may be omitted where not necessary. The device 400 includes a processing unit 402 as well as components coupled thereto.

In embodiments, there may be a low power indoor (LPI) frame available to be transmitted to LPI devices such as an Internet of Things (IoT) frame. A diversity scheme may be applied such as a DCM, tone mapper or different BCC puncturing patterns to the payload portion of the LPI frame when the payload portion is duplicated in the frequency domain.

The processing unit 402 may comprise any type of electronic data processor. The memory 415 may comprise any type of non-transitory system memory such as static random access memory (SRAM), dynamic random access memory (DRAM), synchronous DRAM (SDRAM), read-only memory (ROM), or a combination thereof. In an embodiment, the memory 415 may include ROM for use at boot-up, and DRAM for program and data storage for use while executing programs. The bus 410 may be one or more of any type of several bus architectures including a memory bus or memory controller, a peripheral bus, or a video bus. Additionally or alternatively to the CPU, the device may include other processing electronics, such as digital electronics, analog electronics, or a combination thereof. The processing electronics can include field programmable gate arrays, application specific integrated circuits, digital logic circuits, analog circuits, or the like, or a combination thereof.

The mass storage element 420 may include any type of non-transitory storage device, such as a solid state drive, hard disk drive, a magnetic disk drive, an optical disk drive, USB drive, or any computer program product configured to store data and machine executable program code. According to certain embodiments, the memory 415 or mass storage element 420 may have recorded thereon statements and instructions executable by the CPU 405 for performing any of the aforementioned method operations described above.

The mass storage element 420 may comprise any type of non-transitory storage device configured to store data, programs, and other information and to make the data, programs, and other information accessible via the bus 410. The mass storage element 420 may comprise, for example, one or more of a solid state drive, hard disk drive, a magnetic disk drive, or an optical disk drive.

The video adapter 425 and the I/O interface 430 provide optional interfaces to couple external input and output devices to the CPU 405 or other processing electronics. Examples of input and output devices include a display 435 coupled to the video adapter 425 and an I/O device 440 such as a touch-screen coupled to the I/O interface 430. Other devices may be coupled to the processing unit 402, and additional or fewer interfaces may be utilized. For example, a serial interface such as Universal Serial Bus (USB) (not shown) may be used to provide an interface for an external device.

The processing unit 402 may include a transmitter portion to transmit data to wired links, such as an Ethernet cable, and/or wireless links. The transmitter portion includes framer 450 coupled to radio portion 455. The radio portion 455 interfaces to antennas to access one or more wireless network 445. The framer 450 and radio portion 455 allow the processing unit 402 to communicate with remote entities via the networks 445. In an embodiment, the processing unit 402 is coupled to a local-area network or a wide-area network for data processing and communications with remote devices, such as other processing units, the Internet, or remote storage facilities.

Radio portion 455 may be coupled to M antennas $A_1$, $A_2 \ldots A_M$ that may be used for transmitting and receiving. Framer 450 produces frame preamble data for a packet (or frame) as discussed herein. For example, framer 450 produces a frame with a preamble which is frequency domain duplicated to provide a plurality of sub-bands each having a preamble and includes an EHT-SIG 30 field in each sub-band. Framer 450 may include a frequency domain duplicator for duplicating at least a portion of a frame to form a first portion at a first frequency and a second portion at a second frequency. The framer can also include an encoder for encoding and applying a diversity scheme to at least one field of the first portion, and for encoding and applying a diversity scheme to at least one field of the second preamble portion. The duplicator can duplicate 40 MHz channels which include two 20 MHZ channels to produce two 40 MHz channels each of which include two 20 MHZ channels. The encoder can encode the EHT-SIG fields of each of these preambles as discussed herein. The communications device 400 also includes a radio portion 455 for transmitting the frame on the M transmit antennas $A_1, A_2, \ldots, A_M$, and may include an STBC encoder for mapping said N streams onto the M antennas for transmission. M may be greater than or equal to one. The framer 450 and radio portion 455 may be implemented by CPU 405 and associated memory 415, or by other processing electronics of the processing unit 402. The processors may include FPGAs, ASICs, general purpose micro-processors or the like. It should be appreciated that there are other components of the transmitter circuitry which are not germane to the present disclosure and are therefore not shown.

Processing unit 402 may include a receiver portion utilizing antennas $A_1, A_2 \ldots A_M$, according to an embodiment. The receiver portion utilizes radio portion 455 for receiving one or more transmitted space-time block code (STBC) encoded streams from the antennas. The radio portion receives a wireless frame as described herein. The receiver portion includes a decoder 460 that can receive duplicated 40 MHz channels A and B each of which include two 20 MHZ channels. The decoder 460 can decode the EHT-SIG fields of each of these channels, as discussed herein. The radio portion 455 and decoder 460 may be implemented by one or more processors 405 and associated memory 415. The processors may include FPGAs, ASICs, general purpose micro-processors or the like. It should be appreciated that there are other components of the receiver circuitry which are not germane to the present disclosure and are therefore not shown. In various embodiments, digital circuitry, analog circuitry, or a combination thereof, can be used to implement the invention. A computer processor implementing instructions stored in memory may be used to implement the invention, however it is considered that this approach may not be sufficiently fast for all applications. Dedicated electronic circuitry may be preferred for higher-speed, lower-power implementations.

Embodiments may be dedicated transmitters that include framer 450 but omit receiver functionality such as decoder 460. Embodiments may also be dedicated receivers that include decoder 460 but omit transmitter functionality such as framer 450. Embodiments may also be transceivers that include both transmitter and receiver functionality such as framer 450 and decoder 460.

Figure 5:
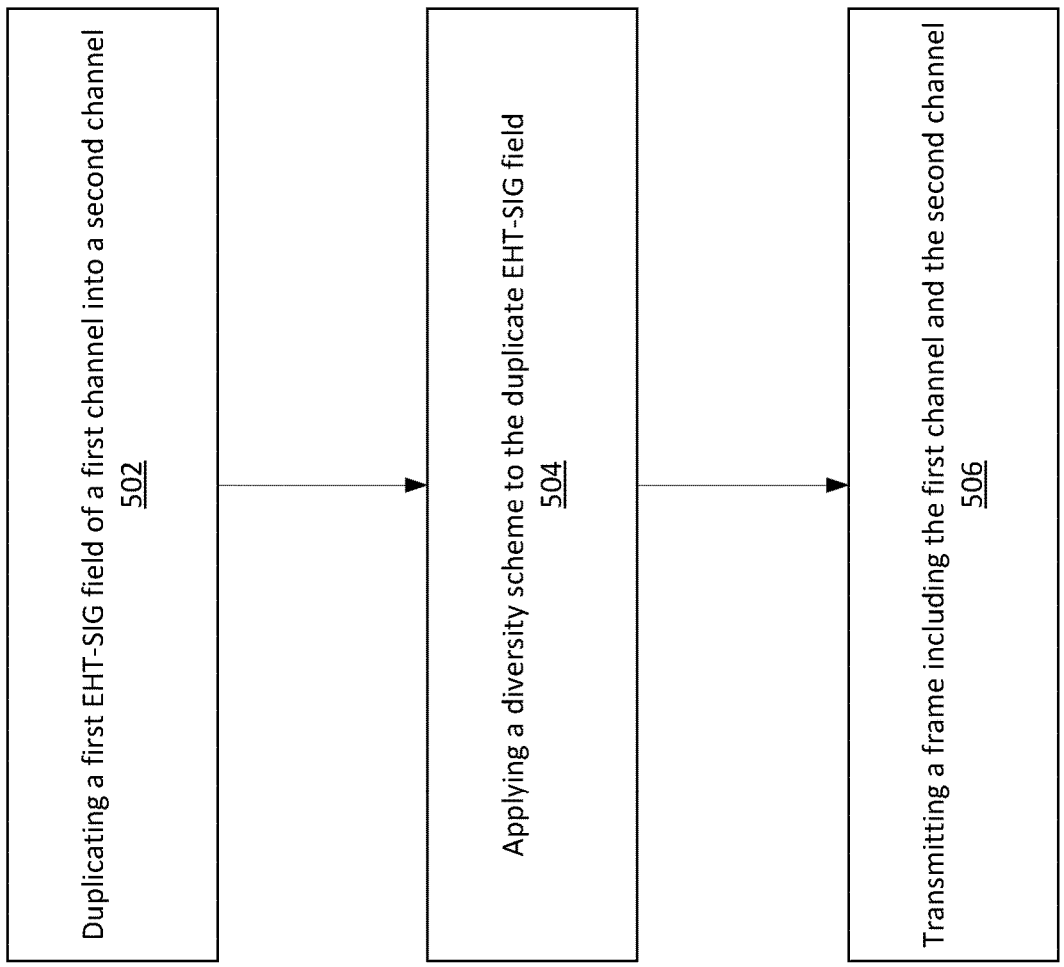
FIG. 5 illustrates a communications method with an EHT-SIG field of first channel being duplicated, according to an embodiment of the present disclosure.

FIG. 5 illustrates a communications method according to an embodiment. The method includes a first step 502 including the duplication of a first EHT-SIG 1 field 30 of a first 20 MHz channel 1 202 into a third EHT-SIG 1 field 34 in a third 20 MHz channel 204. Both the first channel 1 202 and the third channel 3 206 form portions of a wireless frame. Step 504 includes applying a diversity scheme to one of the first EHT-SIG 1 field 30 or the third EHT-SIG 1 field 34. Step 506 includes transmitting the frame.

In a further embodiment, step 504 may be modified to apply a diversity scheme to only one of the first EHT-SIG 1 field 30 or the third EHT-SIG 1 field 34 and a different diversity scheme may be applied to the one of the first EHT-SIG 1 field 30 or the third EHT-SIG 1 field 34 that did not have the first diversity scheme applied to it. In this way, EHT-SIG 1 30 and EHT-SIG 1 34 may have different diversity schemes applied to them.

Figure 6:
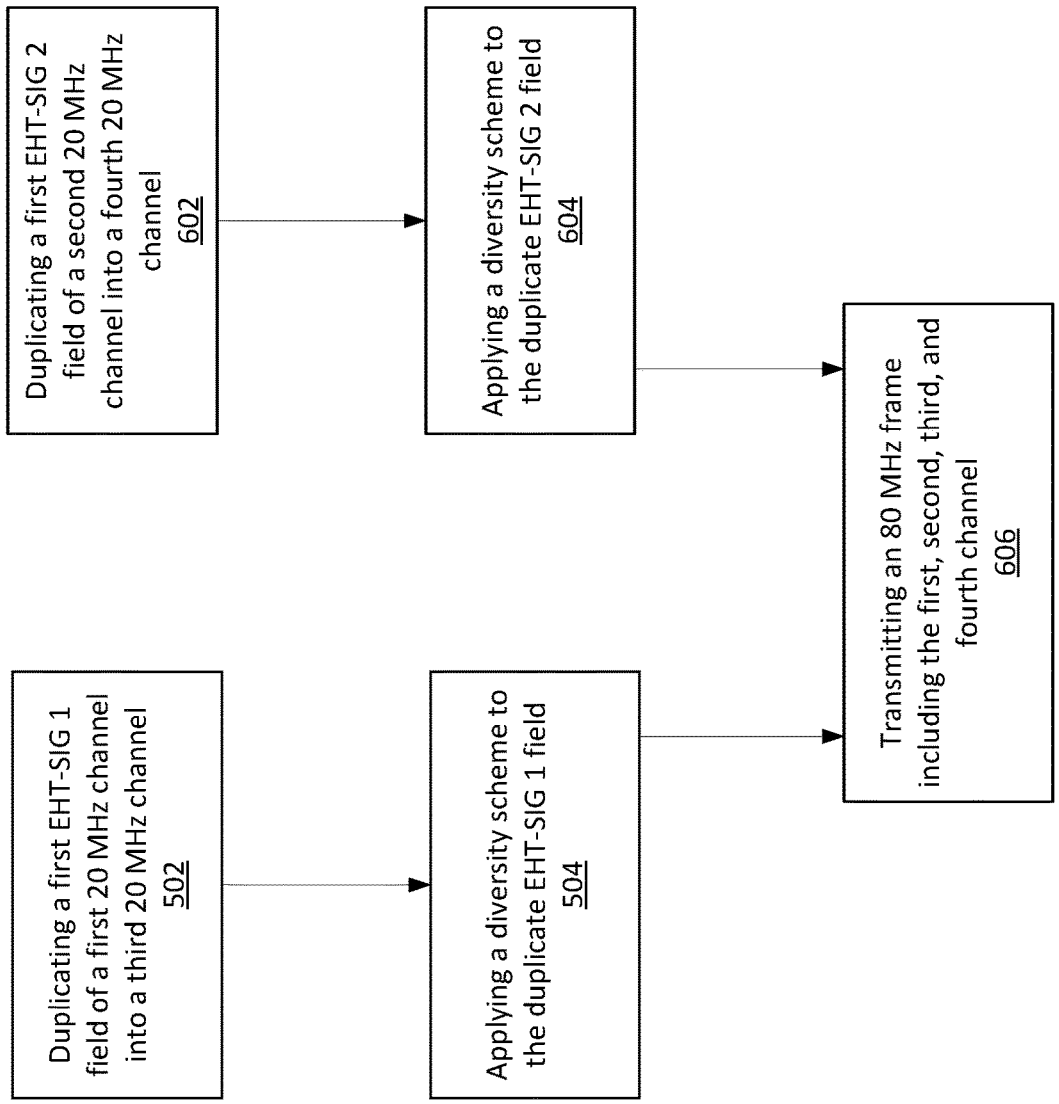
FIG. 6 illustrates a communications method with an EHT-SIG 1 field of first channel and an EHT-SIG 2 of a second channel being duplicated, according to an embodiment of the present disclosure.

FIG. 6 illustrates a communications method according to an embodiment of the present invention. The method includes step 502 and step 504 from FIG. 5. The method of FIG. 6 adds to this with step 602 including the duplication of a second EHT-SIG 2 field 32 of a second 20 MHz channel 2 204 into a fourth EHT-SIG 2 field 36 in a fourth 20 MHz channel 208. Both the second channel 2 204 and the fourth channel 4 208 form portions of the wireless frame. Step 604 includes applying a diversity scheme to one of the second EHT-SIG 2 field 32 or the fourth EHT-SIG 2 field 36. Step 606 includes transmitting an 80 MHz frame that includes the first channel 1 202, the second channel 2 204, the third channel 3 206, and the fourth channel 4 208.

In a further embodiment, step 604 may be modified to apply a diversity scheme to only one of the second EHT-SIG 2 field 32 or the fourth EHT-SIG 2 field 36, and a different, diversity scheme may be applied to the one of the second EHT-SIG 2 field 32 or the fourth EHT-SIG 2 field 36 that did not have the first diversity scheme applied to it. In this way, EHT-SIG 2 32 and EHT-SIG 2 36 have different diversity schemes applied to them.

In embodiments, the same diversity scheme may be applied to first EHT-SIG 1 field 30 and to second EHT-SIG 2 field 32, that is the EHT-SIG fields of 40 MHz channel A 210. In other embodiments, the same diversity scheme may be applied to third EHT-SIG 1 field 34 and to fourth EHT-SIG 2 field 36, that is the EHT-SIG fields of 40 MHz channel B 212.

In embodiments, a diversity scheme may be applied to both first EHT-SIG 1 field 30 and to second EHT-SIG 2 field 32, and another different diversity scheme may be applied to third EHT-SIG 1 field 34 and to fourth EHT-SIG 2 field 36.

Figure 7:
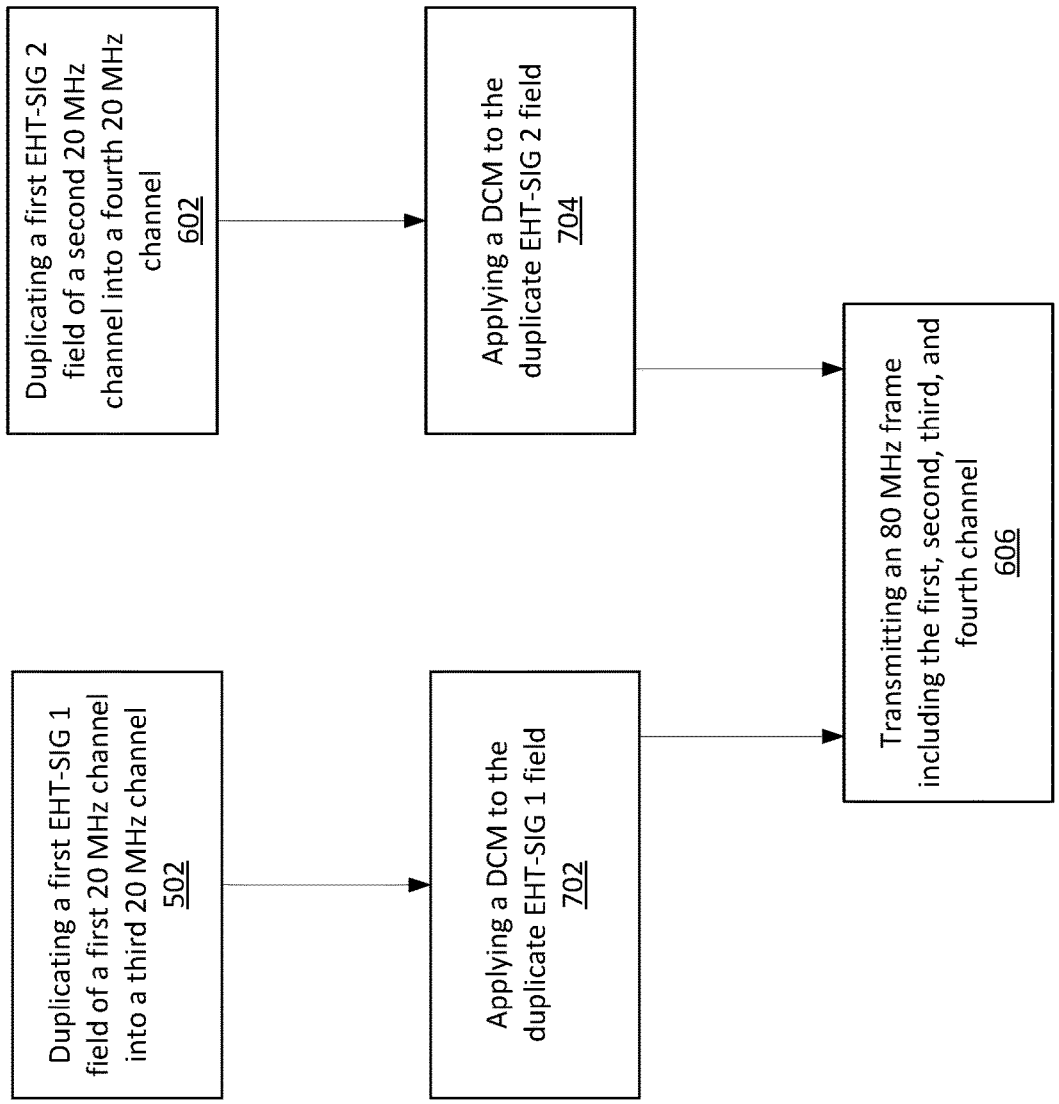
FIG. 7 illustrates a communications method with an EHT-SIG 1 field of first channel and an EHT-SIG 2 of a second channel being duplicated and a dual sub-carrier modulation (DCM) scheme being applied to the duplicate fields, according to an embodiment of the present disclosure.

FIG. 7 illustrates a communications method according to an embodiment of the present invention. The method includes step 502 from FIG. 5, and step 602 and step 606 from FIG. 6. The method of FIG. 7 differs from the method of FIG. 6 in that in step 702 the duplicate EHT-SIG 1 field 34 has a DCM diversity scheme applied and in step 704 the duplicate EHT-SIG 2 field 36 has a DCM diversity scheme applied. As before, step 606 includes transmitting an 80 MHz frame that includes the first channel 1 202, the second channel 2 204, the third channel 3 206, and the fourth channel 4 208.

Figure 8:
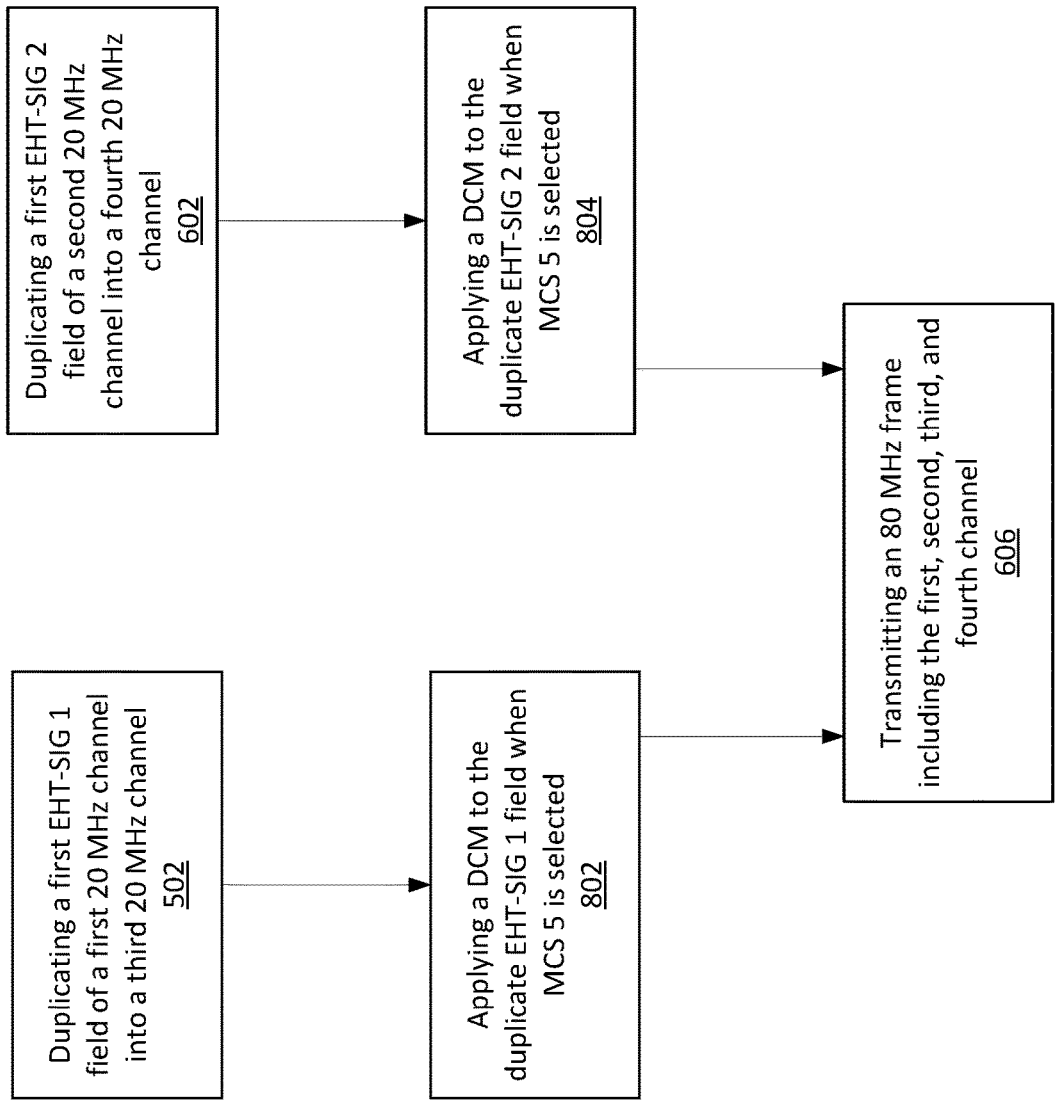
FIG. 8 illustrates a communications method with an EHT-SIG 1 field of first channel and an EHT-SIG 2 of a second channel being duplicated and a dual sub-carrier modulation (DCM) scheme being applied to the duplicate fields when an MCS 5 option is selected, according to an embodiment of the present disclosure.

FIG. 8 illustrates a communications method according to an embodiment of the present invention. The method includes step 502 from FIG. 5, and step 602 and step 606 from FIG. 6. The method of FIG. 8 differs from the method of FIG. 6 in that in step 802 the duplicate EHT-SIG 1 field 34 has a DCM diversity scheme applied when MCS 5 is selected and in step 804 the duplicate EHT-SIG 2 field 36 has a DCM diversity scheme applied when MCS 5 is selected. As before, step 606 includes transmitting an 80 MHz frame that includes the first channel 1 202, the second channel 2 204, the third channel 3 206, and the fourth channel 4 208.

Figure 9:
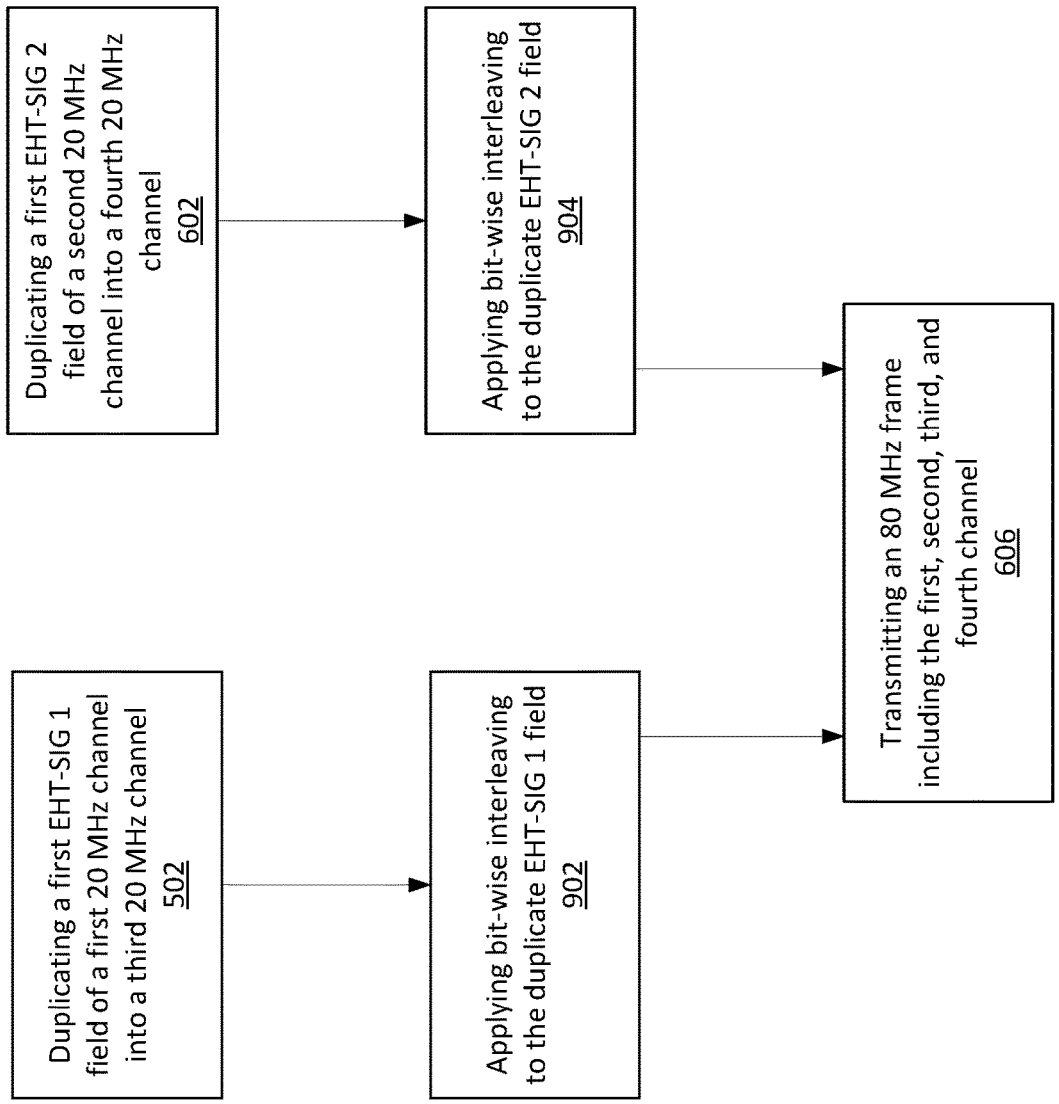
FIG. 9 illustrates a communications method with an EHT-SIG 1 field of first channel and an EHT-SIG 2 of a second channel being duplicated and a bit-wise interleaving scheme being applied to the duplicate fields, according to an embodiment of the present disclosure.

FIG. 9 illustrates a communications method according to an embodiment of the present invention. The method includes step 502 from FIG. 5, and step 602 and step 606 from FIG. 6. The method of FIG. 9 differs from the method of FIG. 6 in that in step 902 the duplicate EHT-SIG 1 field 34 has a bit-wise interleaving diversity scheme applied and in step 904 the duplicate EHT-SIG 2 field 36 has a bit-wise interleaving diversity scheme applied. As before, step 606 includes transmitting an 80 MHz frame that includes the first channel 1 202, the second channel 2 204, the third channel 3 206, and the fourth channel 4 208.

Figure 10:
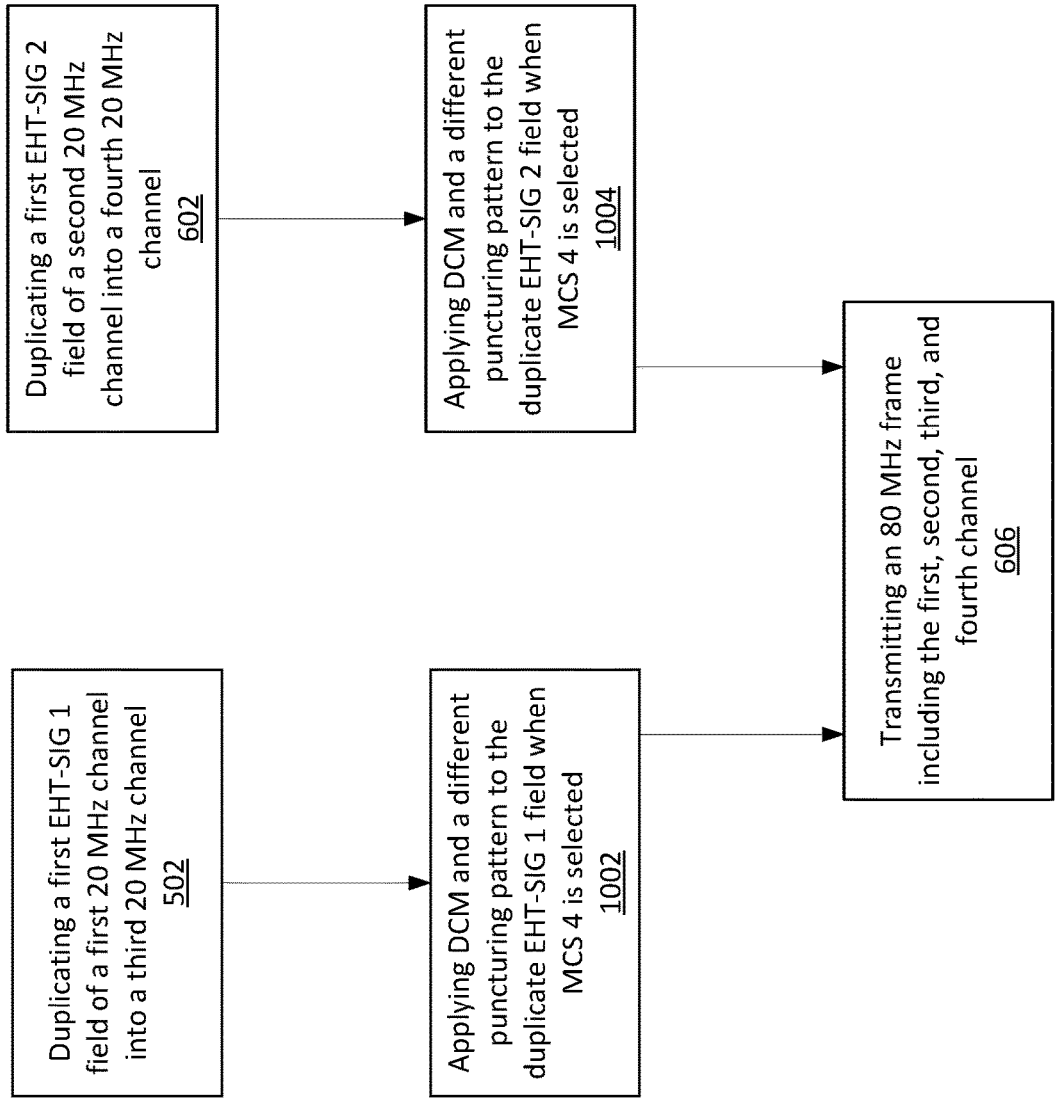
FIG. 10 illustrates a communications method with an EHT-SIG 1 field of first channel and an EHT-SIG 2 of a second channel being duplicated and a dual sub-carrier modulation (DCM) scheme and a different puncturing pattern being applied to the duplicate fields when an MCS 4 option is selected, according to an embodiment of the present disclosure.

FIG. 10 illustrates a communications method according to an embodiment of the present invention. The method includes step 502 from FIG. 5, and step 602 and step 606 from FIG. 6. The method of FIG. 10 differs from the method of FIG. 6 in that in step 1002 the duplicate EHT-SIG 1 field 34 has a DCM and a different puncturing pattern diversity scheme applied when MCS 4 is selected and in step 1004 the duplicate EHT-SIG 2 field 36 has a DCM and a different puncturing pattern diversity scheme applied when MCS 4 is selected. As before, step 606 includes transmitting an 80 MHz frame that includes the first channel 1 202, the second channel 2 204, the third channel 3 206, and the fourth channel 4 208.

Figure 11:
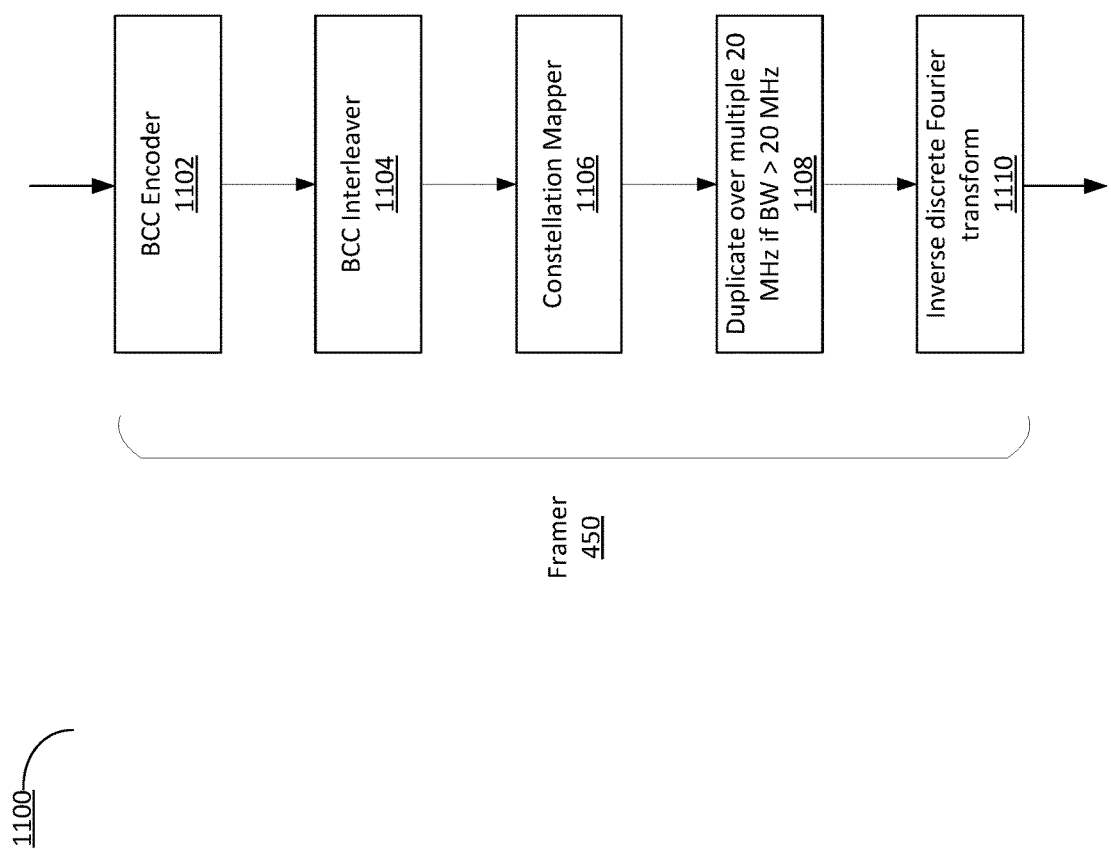
FIG. 11 illustrates a block diagram of an apparatus to perform a first encoding method for a wireless communications channel, according to an embodiment of the present disclosure.

FIG. 11 illustrates a block diagram of an apparatus 1100 to perform a first encoding method for a wireless communications channel, according to an embodiment of the present disclosure. Portions of apparatus 1100 may be implemented by a combination of hardware and software as shown as framer 450 of FIG. 4. Portions of apparatus 1100 may also be implemented using CPU 405, memory 415, and other components of communications device 402. Data to be transmitted is received by BCC encoder 1102. The BCC encoded data is then sent to BCC interleaver 1104. Subsequently, the data is sent to constellation mapper 1106 to be QAM encoded. If the QAM encoded data is to be duplicated over multiple 20 MHz channels this is performed in step 1108. The data then has an inverse discrete Fourier transform applied after which it may be further processed or sent to the radio portion 460 of communications device 402. Specific implementations may modify the order of steps, insert additional steps, or omit other steps to obtain results that meet the specifications of the application.

Figure 12:
FIG. 12 illustrates a block diagram of an apparatus to perform a second encoding method for a wireless communications channel, according to an embodiment of the present disclosure.

FIG. 12 illustrates a block diagram of an apparatus 1200 to perform a second encoding method for a wireless communications channel, according to an embodiment of the present disclosure. Portions of apparatus 1200 may be implemented by a combination of hardware and software as shown as framer 450 and radio portion 460 of FIG. 4. Portions of apparatus 1100 may also be implemented using CPU 405, memory 415, and other components of communications device 402. Data to be transmitted is received by scrambler 1202. The scrambled data is sent to constellation mapper 1206 to be QAM encoded. The QAM encoded data is then sent to a tone mapper in step 1208. Spatial and frequency mapping is done in step 1210 and the data then has an inverse discrete Fourier transform applied in step 1212. In step 1214 a guard window (GI) is inserted. Data is then sent to radio portion 455 for transmission. Specific implementations may modify the order of steps, insert additional steps, or omit other steps to obtain results that meet the specifications of the application.

An embodiment of the disclosure includes a method of communication including duplicating a first field of a first channel into a third field in a third channel where the first channel is a first portion of the frame and the third channel is a third portion of the frame. The method includes applying a first diversity scheme to only one of the first field or the third field. For example, the first diversity scheme may be applied to the first field or the third field, but not both. The method includes duplicating a second field of a second channel into a fourth field in a fourth channel where the second channel is a second portion of the frame and the fourth channel is a fourth portion of the frame. The first channel and the second channel form a first group of channels. The third channel and the fourth channel form a second group of channels. The method may include applying a second diversity scheme to only one of the second field or the fourth field. For example, the second diversity scheme may be applied to the second field or the fourth field, but not both. The method includes transmitting the frame.

In further embodiments, the first diversity scheme is applied to the first field and the second diversity scheme is applied to the second field, and the first diversity scheme and the second diversity scheme are the same.

In further embodiments, the first diversity scheme is applied to the third field and the second diversity scheme is applied to the fourth field, and the first diversity scheme and the second diversity scheme are the same.

In order to apply a diversity scheme to one field or another field, but not both, embodiments of the present invention can detect whether the diversity scheme is being applied to one of the fields. If the diversity scheme is not being applied to the detected one of the fields, embodiments of the present invention can be configured to apply the diversity scheme to the other one of the fields. If the diversity scheme is being applied to the detected one of the fields, embodiments of the present invention can be configured to inhibit applying the same diversity scheme to the other one of the fields. In such cases, either no diversity scheme is applied to the other one of the fields, or a different diversity scheme is applied to the other one of the fields.

Further embodiments include applying a third diversity scheme, different from the first diversity scheme, to the one of the first field or the third field to which the first diversity scheme is not applied. Further embodiments may also include applying a fourth diversity scheme, different from the second diversity scheme, to the one of the second field or the fourth field to which the second diversity scheme is not applied.

In further embodiments, the first channel, the second channel, the third channel, and the fourth channel are 20 MHz channels compatible with an 802.11 wireless standard, and the frame is an 80 MHz channel compatible with the 802.11 wireless standard.

In further embodiments, the first field and the third field are extremely high throughput signal (EHT-SIG) fields.

In further embodiments, the second field and the fourth field are extremely high throughput signal (EHT-SIG) fields.

In further embodiments, the first diversity scheme or the second diversity scheme is a dual sub carrier modulation (DCM) applied to the third channel and the fourth channel. In further embodiments, an MCS 5 option has been selected.

In further embodiments, the first diversity scheme or the second diversity scheme is a tone mapper applied to the QAM symbols of the third channel and the fourth channel.

In further embodiments, the first diversity scheme or the second diversity scheme is a different binary convolutional coding (BCC) puncturing pattern applied to the third channel and the fourth channel while an MCS 4 option has been selected.

An embodiment of the disclosure includes a communications device for transmitting a wireless frame. The communications device includes a framer for producing a frame, a radio unit for transmitting the frame, and processing electronics. The processing electronics cause the communications device to duplicate a first field of a first channel into a third field in a third channel where the first channel is a first portion of the frame and the third channel is a third portion of the frame. The processing electronics cause the communications device to apply a first diversity scheme to only one of the first field or the third field. The processing electronics cause the communications device to duplicate a second field of a second channel into a fourth field in a fourth channel where the second channel is a second portion of the frame and the fourth channel is a fourth portion of the frame. The first channel and the second channel form a first group of channels. The third channel and the fourth channel form a second group of channels. The processing electronics cause the communications device to apply a second diversity scheme to only one of the second field or the fourth field. The processing electronics cause the communications device to transmit the frame.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of communication comprising:
  duplicating a first field of a first content channel into a third field in a third content channel, the first content channel being a first portion of the frame, the third content channel being a third portion of the frame;
  applying a first diversity scheme to only one of the first field or the third field;
  duplicating a second field of a second content channel into a fourth field in a fourth content channel, the second content channel being a second portion of the frame, the fourth content channel being a fourth portion of the frame, the first content channel and the second content channel forming a first group of content channels, the third content channel and the fourth content channel forming a second group of content channels;

applying a second diversity scheme to only one of the second field or the fourth field; and transmitting the frame.

2. The method of claim 1 wherein the first diversity scheme is applied to the first field and the second diversity scheme is applied to the second field, and the first diversity scheme and the second diversity scheme are the same.

3. The method of claim 1 wherein the first diversity scheme is applied to the third field and the second diversity scheme is applied to the fourth field, and the first diversity scheme and the second diversity scheme are the same.

4. The method of claim 1 further comprising:

applying a third diversity scheme, different from the first diversity scheme, to the one of the first field or the third field to which the first diversity scheme is not applied; and applying a fourth diversity scheme, different from the second diversity scheme, to the one of the second field or the fourth field to which the second diversity scheme is not applied.

5. The method of claim 1 wherein the first content channel, the second content channel, the third content channel, and the fourth content channel are 20 MHz content channels compatible with an 802.11 wireless standard, and the frame is an 80 MHz channel compatible with the 802.11 wireless standard.

6. The method of claim 1 wherein the first field and the third field are extremely high throughput signal (EHT-SIG) fields.

7. The method of claim 1 wherein the second field and the fourth field are extremely high throughput signal (EHT-SIG) fields.

8. The method of claim 1 wherein the first diversity scheme or the second diversity scheme is a dual sub carrier modulation (DCM) applied to the third content channel and the fourth content channel.

9. The method of claim 1 wherein an MCS 5 option has been selected.

10. The method of claim 1 wherein the first diversity scheme or the second diversity scheme is a tone mapper applied to the QAM symbols of the third content channel and the fourth content channel.

11. The method of claim 1 wherein the first diversity scheme or the second diversity scheme is a different binary convolutional coding (BCC) puncturing pattern applied to the third content channel and the fourth content channel while an MCS 4 option has been selected.

12. A communications device for transmitting a wireless frame comprising:

a framer for producing a frame;

a radio unit for transmitting the frame; and processing electronics causing the communications device to:

duplicate a first field of a first content channel into a third field in a third content channel, the first content channel being a first portion of the frame, the third content channel being a third portion of the frame;

apply a first diversity scheme to only one of the first field or the third field;

duplicate a second field of a second content channel into a fourth field in a fourth content channel, the second content channel being a second portion of the frame, the fourth content channel being a fourth portion of the frame, the first content channel and the second content channel forming a first group of content channels, the third content channel and the fourth content channel forming a second group of content channels;

apply a second diversity scheme to only one of the second field or the fourth field; and transmit the frame.

13. The communications device of claim 12 wherein the first content channel, the second content channel, the third content channel, and the fourth content channel are 20 MHz content channels compatible with an 802.11 wireless standard, and the frame is an 80 MHz channel compatible with the 802.11 wireless standard.

14. The communications device of claim 12 wherein the first field and the third field are extremely high throughput signal (EHT-SIG) fields.

15. The communications device of claim 12 wherein the second field and the fourth field are extremely high throughput signal (EHT-SIG) fields.

16. The communications device of claim 12 wherein the first diversity scheme or the second diversity scheme is a dual sub carrier modulation (DCM) is applied to the third content channel and the fourth content channel.

17. The communications device of claim 12 wherein an MCS 5 option has been selected.

18. The communications device of claim 12 wherein the first diversity scheme or the second diversity scheme is a tone mapper applied to the QAM symbols of the third content channel and the fourth content channel.

19. The communications device of claim 12 wherein the first diversity scheme or the second diversity scheme is a different binary convolutional coding (BCC) puncturing pattern applied to the third content channel and the fourth content channel while an MCS 4 option has been selected.

* * * * *